United States Patent
Shibata

(10) Patent No.: US 11,210,117 B2
(45) Date of Patent: Dec. 28, 2021

(54) INFORMATION PROCESSING APPARATUS, INFORMATION PROCESSING METHOD, AND RECORDING MEDIUM

(71) Applicant: Yuto Shibata, Kanagawa (JP)

(72) Inventor: Yuto Shibata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/921,067

(22) Filed: Jul. 6, 2020

(65) Prior Publication Data

US 2021/0011746 A1  Jan. 14, 2021

(30) Foreign Application Priority Data

Jul. 9, 2019 (JP) .............................. JP2019-127973

(51) Int. Cl.
| | | |
|---|---|---|
| *H04N 1/00* | (2006.01) | |
| *G06F 9/451* | (2018.01) | |
| *G06F 3/0482* | (2013.01) | |
| *G06F 9/54* | (2006.01) | |
| *G06F 3/12* | (2006.01) | |

(52) U.S. Cl.
CPC ............ *G06F 9/453* (2018.02); *G06F 3/0482* (2013.01); *G06F 9/542* (2013.01); *G06F 3/1253* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0009793 A1* | 1/2009 | Ozawa | ............... | H04N 1/00482 358/1.15 |
| 2010/0145808 A1* | 6/2010 | Hilbert | ................... | G06Q 30/02 705/14.66 |
| 2010/0169877 A1* | 7/2010 | Ackerman | ............... | G06F 8/65 717/171 |
| 2010/0250787 A1* | 9/2010 | Miyata | .................... | G06F 8/656 710/9 |
| 2011/0002001 A1* | 1/2011 | Tokura | ................. | G06K 15/005 358/1.14 |
| 2011/0258549 A1* | 10/2011 | Chapple | ................ | G06F 3/0482 715/733 |
| 2012/0154847 A1* | 6/2012 | Ono | .................... | G06K 15/4095 358/1.14 |
| 2015/0016675 A1 | 1/2015 | Kishi | | |
| 2015/0339548 A1 | 11/2015 | Kitayama et al. | | |
| 2016/0150123 A1 | 5/2016 | Okada et al. | | |
| 2017/0078503 A1* | 3/2017 | Kitayama | ............. | G06F 3/1258 |

(Continued)

FOREIGN PATENT DOCUMENTS

| | | |
|---|---|---|
| JP | 2004-260568 | 9/2004 |
| JP | 2015-018405 | 1/2015 |

*Primary Examiner* — Hien L Duong
(74) *Attorney, Agent, or Firm* — IPUSA, PLLC

(57) ABSTRACT

An information processing apparatus includes: a memory that stores a plurality of applications; and circuitry to display on a display, a screen including notification information on a function of a particular application of the plurality of applications, and to activate the particular application in response to an input of a request to execute the function on the screen. The particular application configures the circuitry to execute the function in accordance with guide information defining one or more setting items to be set to execute the function and an order of setting the setting items.

10 Claims, 8 Drawing Sheets

(56) References Cited

U.S. PATENT DOCUMENTS

| | | | |
|---|---|---|---|
| 2017/0085731 A1* | 3/2017 | Akuzawa | H04N 1/00411 |
| 2017/0163826 A1 | 6/2017 | Nakazawa et al. | |
| 2017/0272592 A1 | 9/2017 | Shibata et al. | |
| 2018/0048776 A1* | 2/2018 | Kogure | H04N 1/00411 |
| 2018/0063367 A1 | 3/2018 | Kitayama et al. | |
| 2018/0124265 A1* | 5/2018 | Shibata | H04N 1/00503 |
| 2018/0285027 A1* | 10/2018 | Okajima | G06F 3/1204 |
| 2018/0324313 A1 | 11/2018 | Shibata et al. | |
| 2019/0281175 A1 | 9/2019 | Shibata | |
| 2020/0104082 A1* | 4/2020 | Watanabe | G06F 3/1285 |
| 2020/0210057 A1* | 7/2020 | Yoshihashi | H04L 67/36 |
| 2020/0293252 A1* | 9/2020 | Takato | G06F 3/1279 |
| 2020/0409685 A1* | 12/2020 | Shimomoto | G06Q 30/0641 |

\* cited by examiner

FIG. 7

ADVERTISING CONTENT DATA

| No | ADVERTISEMENT (FUNCTION) | URL | APPLICATION |
|---|---|---|---|
| 1 | COVER SETTING | http://XXXXXXXXXX | COPY APPLICATION A |
| 2 | INTERRUPTION COPYING | http://XXXXXXXXXX | COPY APPLICATION B |
| 3 | EASY FOLDER TRANSMISSION | http://XXXXXXXXXX | SCANNER APPLICATION |
| 4 | ADDRESS BOOK BY LINE | http://XXXXXXXXXX | FAX APPLICATION |

FIG. 8

GUIDE INFORMATION DATA

| No | ADVERTISEMENT (FUNCTION) | GUIDE INFORMATION |
|---|---|---|
| 1 | COVER SETTING | FINISH SETTING > COVER/INSERTION SHEET SETTING > COVER SETTING |
| 2 | INTERRUPTION COPYING | START KEY > INTERRUPTION KEY (DURING JOB EXECUTION) |

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-127973, filed on Jul. 9, 2019, in the Japan Patent Office, the entire disclosure of which is hereby incorporated by reference herein.

BACKGROUND

Technical Field

The present invention relates to an information processing apparatus, an information processing method, and a recording medium.

Description of the Related Art

Conventionally, various functions of an image forming apparatus are provided by application software (hereinafter, also referred to as an application) installed in an image forming apparatus such as a multifunction peripheral. The application in such an image forming apparatus is updated as needed to, for example, add new functions.

In order to promote the use of such new functions, there is a technique for displaying an advertisement on the screen of various apparatuses. For example, it is possible to display an advertisement of an application function on the control panel of an image forming apparatus.

SUMMARY

Example embodiments include an information processing apparatus including: a memory that stores a plurality of applications; and circuitry to display on a display, a screen including notification information on a function of a particular application of the plurality of applications, and to activate the particular application in response to an input of a request to execute the function on the screen. The particular application configures the circuitry to execute the function in accordance with guide information defining one or more setting items to be set to execute the function and an order of setting the setting items.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an example of advertising content data according to the embodiment of the present invention;

FIG. 8 is an example of guide information data according to the embodiment of the present invention;

Figure 1:
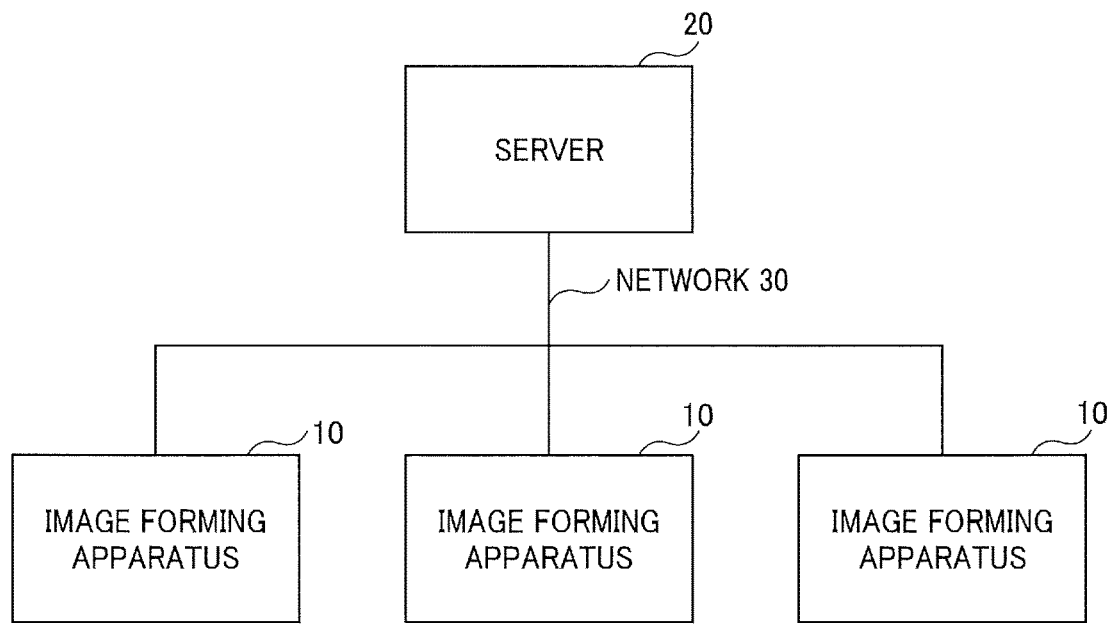
FIG. 1 is a general arrangement of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An advertisement or the like of an application function may be displayed on a control panel of an image forming apparatus. However, even if a user wants to use the application function posted in the advertisement or the like on the control panel of the image forming apparatus, it has been difficult for the user to understand the actual use of the application function just by the advertisement or the like. Accordingly, the user often ends up without using the application function. That is, there has been a disadvantage that even through the user was interested in the advertisement, the user could not easily start using the application function.

In view of the above, the following describes a system that allows the user to easily start using an application function posted in notification information such as an advertisement.

Hereinafter, an embodiment of the present invention will be described referring to the accompanying drawings. In the following, an embodiment will be described in an example case in which an information processing apparatus is implemented as a control device of an image forming apparatus such as a multifunction peripheral (MFP). However, the application of the information processing apparatus according to the present invention is not limited to this, such that any apparatus other than the control device of the image forming apparatus (such as a main device) may be used.

Further, elements in the information processing apparatus may be divided into a control device and a main device of the image forming apparatus. For example, elements may be distributed over an information processing system in which a plurality of apparatuses are communicably connected. In one example, some elements may be implemented integrally or separately in one or more apparatuses other than the image forming apparatus.

In the specification and the drawings, components having substantially the same functional configuration are denoted by the same reference numerals, and redundant description is omitted.

In this specification, an advertisement of an application function will be described as an example, but the present invention is not limited to this, and the present invention can be applied to notification information that notifies the user of the application function.

FIG. 1 is a diagram illustrating a general arrangement of an image forming system according to an embodiment of the present invention. As illustrated in FIG. 1, the image forming system includes a plurality of image forming apparatuses 10 and a server 20. Each image forming apparatus 10 and the server 20 are communicably connected via a network 30.

The image forming apparatus 10 receives, from the server 20, information regarding the advertisement of an application function (hereinafter, also referred to as advertising content). The image forming apparatus 10 controls a display to switch from a screen displaying the advertisement to a screen displaying an application having the function posted in the advertisement, and guides a user to use the function using the screen displaying the application. A control device (information processing apparatus) 110 will be described in detail later, referring to FIG. 6.

The server 20 transmits, to the image forming apparatus 10, information (advertising content) regarding the advertisement of the application function.

In this disclosure, the application function is any desired service that can be provided using the image forming apparatus 10, under control of the application installed in the image fainting apparatus 10.

Figure 2:
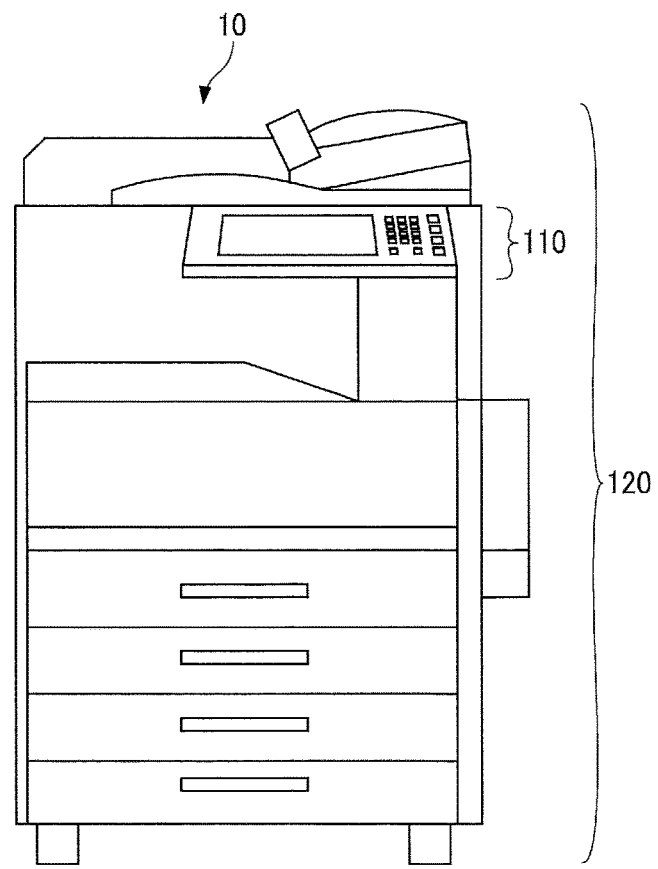
FIG. 2 is a diagram illustrating an outer appearance of an image forming apparatus including a control device (information processing apparatus) according to the embodiment of the present invention.

FIG. 2 is a diagram illustrating an outer appearance of the image forming apparatus 10 including a control device (information processing apparatus) according to the embodiment of the present invention.

The image forming apparatus 10 is, for example, a multifunction peripheral (MFP), and includes image processing functions such as a copy function, a scanner function, a fax function, and a printer function.

As illustrated in FIG. 2, the image forming apparatus 10 includes a control device 110 and a main device 120.

The control device 110 allows the user to perform various operations, such as selecting an image processing function to be executed by the main device 120, inputting various setting values for executing the image processing function, and inputting an execution instruction for executing the image processing function.

The main device 120 executes an image processing function instructed by various user operations input via the control device 110.

Figure 3:
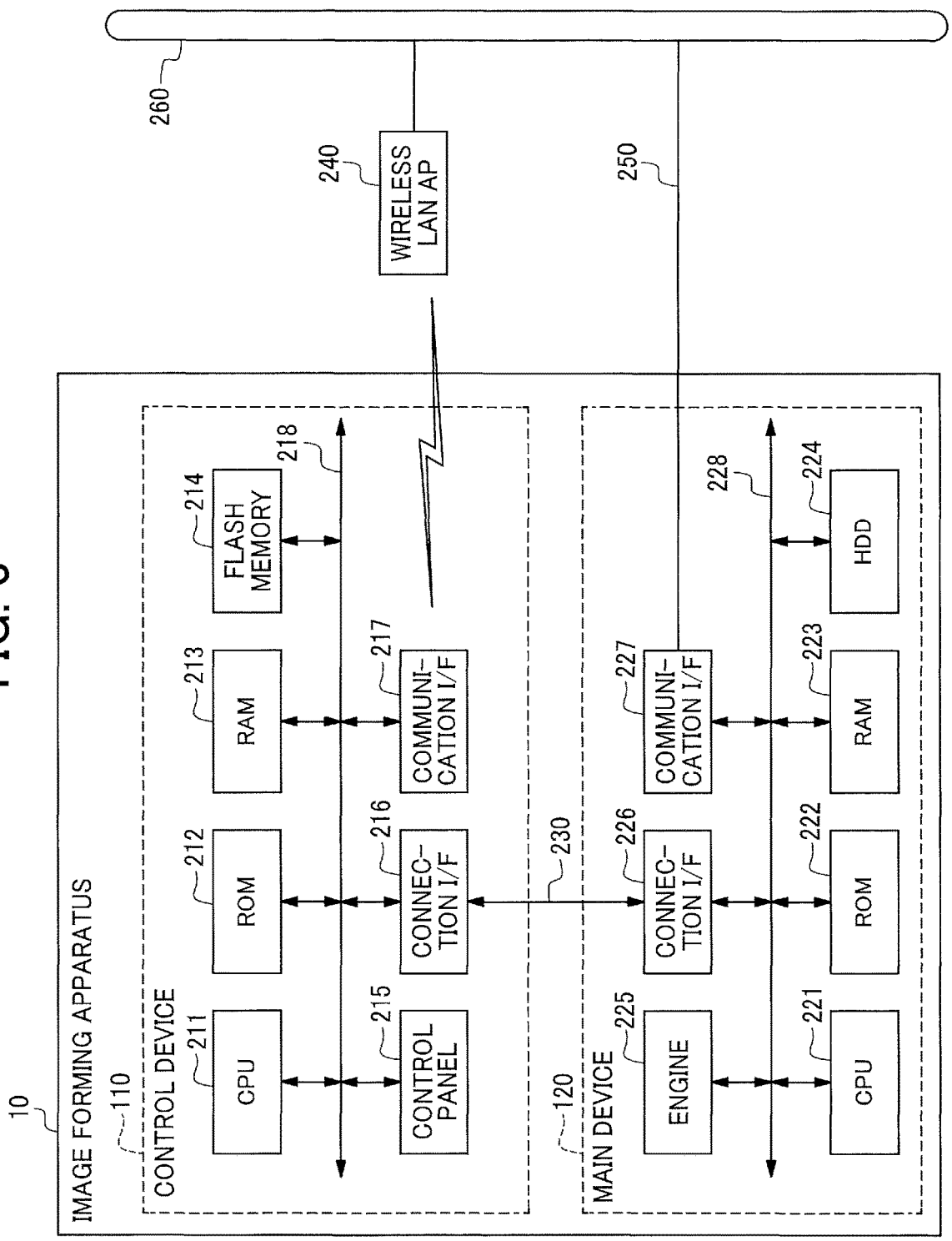
FIG. 3 is a diagram illustrating a hardware configuration of the control device and a main device included in the image forming apparatus according to the embodiment of the present invention.

FIG. 3 is a diagram illustrating a hardware configuration of the control device 110 and the main device 120 included in the image forming apparatus 10 according to the embodiment of the present invention.

As illustrated in FIG. 3, the control device 110 includes a central processing unit (CPU) 211, a read only memory (ROM) 212, a random access memory (RAM) 213, a flash memory 214, a control panel 215, a connection interface (I/F) 216, and a communication I/F 217, which are connected to one another via a bus 218.

The CPU 211 executes various programs stored in the ROM 212 or the flash memory 214 with the use of the RAM 213 as a work area to control the entire control device 110 and implement various functions.

The flash memory 214 is a non-volatile storage medium, and stores various programs executed by the CPU 211 and various data.

The control panel 215 includes a display device and an input device such as a hardware key for the user to perform various operations. The display device of the control panel 215 can further display the operating state of the image forming apparatus 10.

The connection I/F 216 is an interface for communicating with the main device 120 via a communication path 230. Here, a USB standard interface is used.

The communication I/F 217 is an interface for communicating with an external apparatus via a network. In the example of FIG. 3, the communication I/F 217 wirelessly connects to a wireless local area network access point (LAN AP) 240, to communicate with the external apparatus via a network 260.

The main device 120 includes a CPU 221, a ROM 222, a RAM 223, a hard disk drive (HDD) 224, an engine 225, a connection I/F 226, and a communication I/F 227, which are connected to one another via a bus 228.

The CPU 221 executes various programs stored in the ROM 222 or the HDD 224 with the use of the RAM 223 as a work area to control the entire main device 120 and implement various functions.

The HDD 224 is a non-volatile storage medium, and stores various programs executed by the CPU 221 and various data.

The engine 225 is hardware for performing information processing for implementing image processing functions such as a copy function, a scanner function, a fax function, a printer function, and the like. The engine 225 includes, for example, a scanner that scans and reads a document, a plotter that prints on a sheet material such as paper, and a communication circuit that performs facsimile communication. Moreover, the engine 225 may include a finisher that sorts printed sheet materials, and an ADF (automatic document feeder) that automatically feeds the document.

The connection I/F 226 is an interface for communicating with the control device 110 via the communication path 230. Here, a USB standard interface is used.

The communication I/F 227 is an interface for communicating with an external apparatus via the network. In the example of FIG. 3, the communication I/F 227 is connected to the network 260 via a wire 250.

Figure 4:
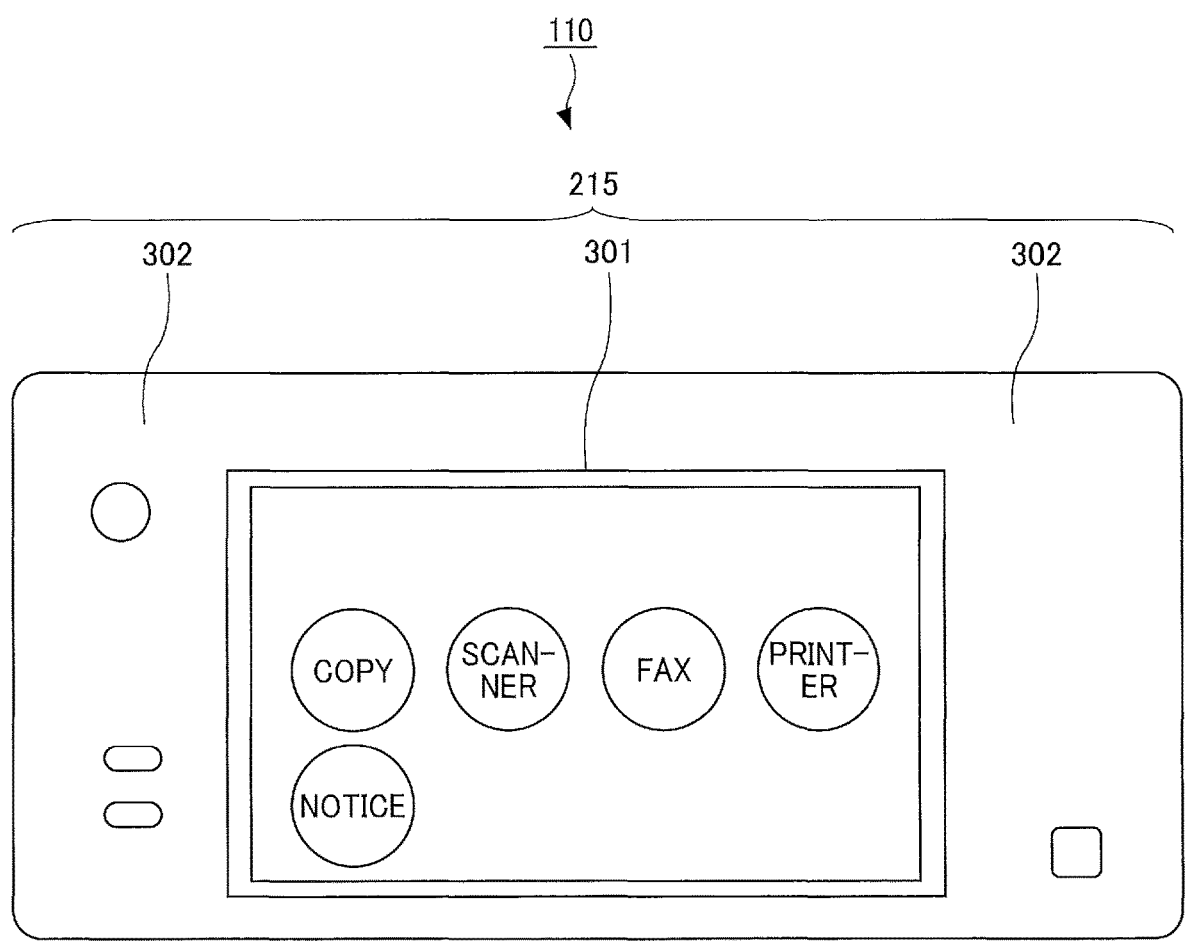
FIG. 4 is a diagram illustrating an outer appearance of a control panel according to the embodiment of the present invention.

FIG. 4 is a diagram illustrating a plan view of the control panel 215 of the control device 110 according to the embodiment of the present invention.

As illustrated in FIG. 4, the control panel 215 includes a display control device 301 including a liquid crystal display (LCD) integrated with a touch panel and a hard key (hard keys) 302.

Various display screens are displayed on the LCD of the display control device 301. In the example of FIG. 4, a display screen for executing image processing functions such as a copy function, a scanner function, a fax function, and a printer function is displayed. When the user selects one of the icons, the touch panel detects the position selected by the user. The main device 120 executes the image processing function corresponding to the content of the user's operation recognized based on the selected position.

In one embodiment of the present invention, an icon (hereinafter, also referred to as a notice icon) for displaying the advertisement of an application function is displayed on the control panel 215 of the control device 110. When the user selects the notice icon, the advertisement of the application function is displayed.

Figure 5:
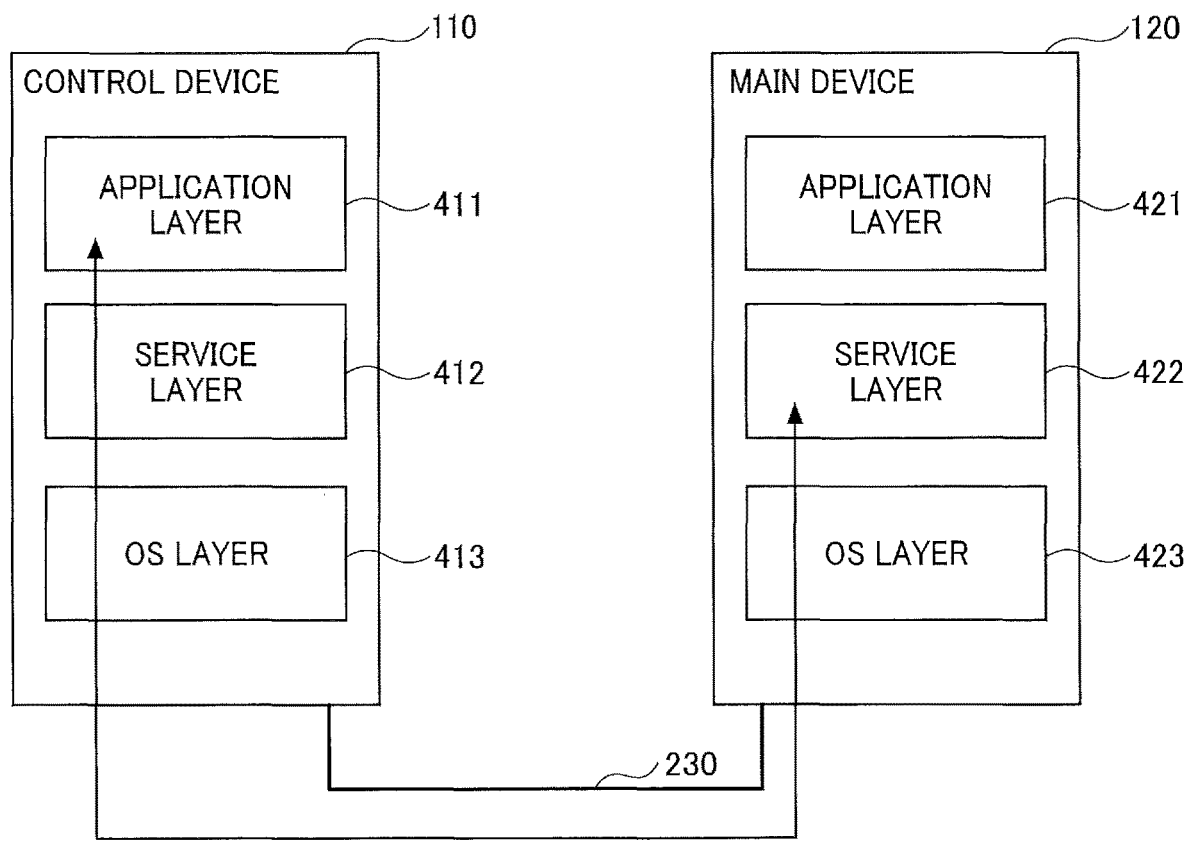
FIG. 5 is a diagram illustrating a hierarchical structure of a program group included in the control device and the main device according to the embodiment of the present invention.

FIG. 5 is a diagram illustrating a hierarchical structure of a program group included in the control device 110 (the ROM 212 and the flash memory 214) and the main device 120 (the ROM 222 and the HDD 224) according to the embodiment of the present invention.

First, the hierarchical structure of the program group included in the main device 120 (the ROM 222 and the HDD 224) will be described. The program group included in the main device 120 can be roughly classified into an application layer 421, a service layer 422, and an operating system (OS) layer 423. The program that can be classified into the application layer 421 is a program for operating the hardware resources to implement an image processing function. Specifically, a copy application, a scanner application, a fax application, a printer application, and the like can be given as examples.

The program classified into the service layer 422 is a program interposed between the application layer 421 and the OS layer 423. The program serves as an interface, for the program in the application layer 421 to use the hardware resources provided in the main device 120, and for notifying the application layer 421 of the state of the hardware resources provided in the main device 120.

Specifically, the program accepts an operation request for a hardware resource, arbitrates the accepted operation request, and transmits an error detected in the hardware resource to the application layer 421 as an error notification. The operation requests accepted by the service layer 422 include, for example, operation requests such as reading by a scanner and printing by a plotter.

The role of the program classified into the service layer 422 as the abovementioned interface is the same for the application layer 411 of the control device 110. In other words, the program classified into the application layer 411 of the control device 110 also accesses the service layer 422 and operates the hardware resources of the main device 120, and can implement the image processing function.

The OS layer 423 is a program called basic software, and provides a basic function of controlling the hardware resources provided in the main device 120. The program classified into the service layer 422 converts the operation request for a hardware resource from the program classified into the application layer 421 into a command that can be interpreted by the OS layer 423 and passes the command to the OS layer 423. Then, the program classified into the OS layer 423 executes the command to implement the image processing function in accordance with the operation request for the hardware resource. In addition, the program classified into the OS layer 423 is executed to receive the error detected in the hardware resource, and pass the error, as an error notification, to the service layer 422 that performs transmission to the application layer 421.

Next, the hierarchical structure of the program group included in the control device 110 (the ROM 212 and the flash memory 214) will be described. As is the case with the main device 120, the program group included in the control device 110 also can be roughly classified into the application layer 411, a service layer 412, and an OS layer 413.

However, the functions provided by the program classified into the application layer 411 and the types of operation requests that can be accepted by the service layer 412 are different from the function and the types of the operation requests of the main device 120. The programs classified into the application layer 411 of the control device 110 mainly provide a user interface function for performing operations and display related to the image processing function provided by the main device 120.

In this embodiment, the OS operates independently of the control device 110 and the main device 120. That is, as long as the control device 110 and the main device 120 can communicate with each other, the OS for the control device 110 and the main device 120 does not need to be the same type. For example, it is possible to use Android (registered trademark) for the control device 110 and Linux (registered trademark) for the main device 120.

As described above, in the image forming apparatus 10, since the control device 110 and the main device 120 are controlled by different OSs, the communication between the control device 110 and the main device 120 is not an inter-process communication in one apparatus and is performed as a communication between different apparatuses.

An operation that transmits various user operations accepted by the control device 110 to the main device 120 (command communication) and an operation that transmits an event that the main device 120 instructs the control device 110 to display a display screen (for example, an error notification, and an error cancellation notification) correspond to the communication between different apparatuses.

Figure 6:
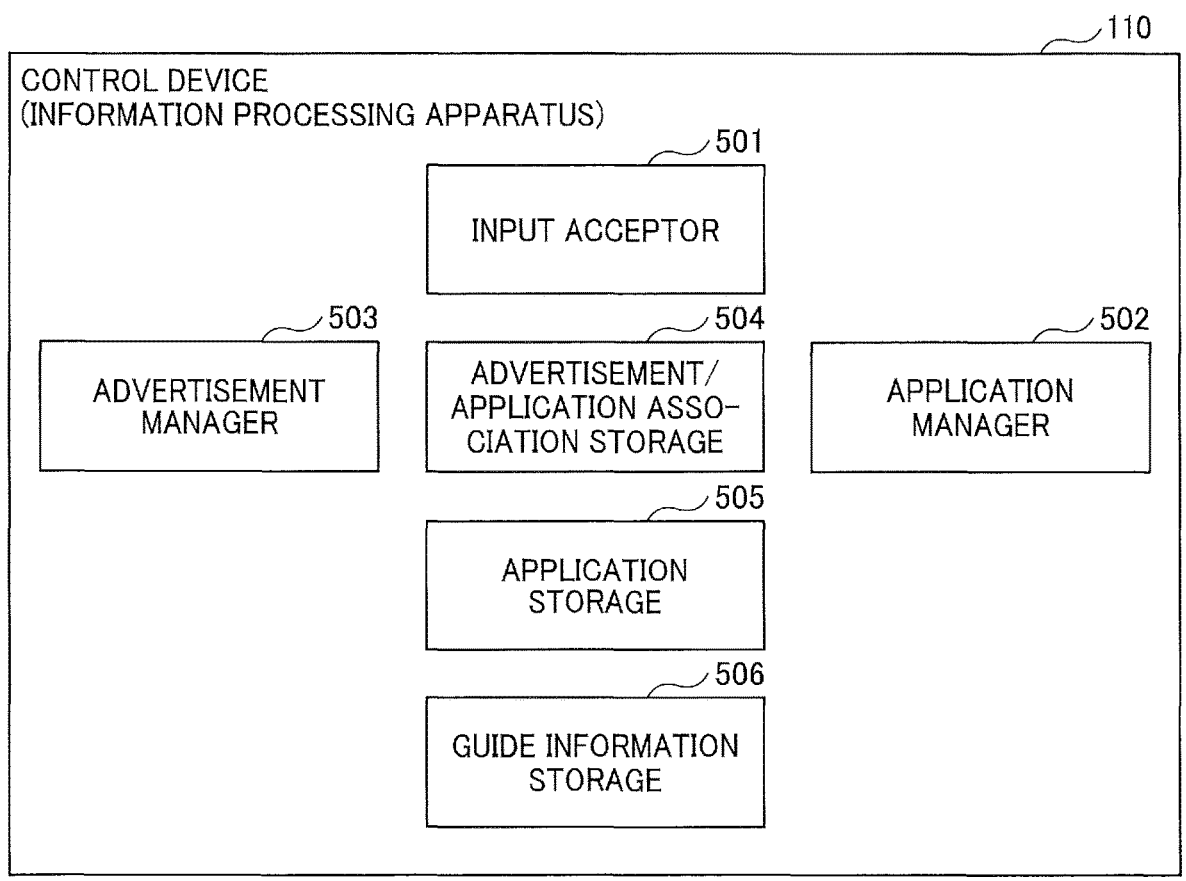
FIG. 6 is a functional block diagram of the control device (information processing apparatus) according to the embodiment of the present invention.

FIG. 6 is a functional block diagram of the control device (information processing apparatus) 110 according to the embodiment of the present invention. As illustrated in FIG. 6, the control device 110 (information processing apparatus) includes an input acceptor 501, an application manager 502, an advertisement manager 503, an advertisement/application association storage 504, an application storage 505, and a guide information storage 506. Specifically, the control device (information processing apparatus) 110 executes a program to function as the input acceptor 501, application manager 502, and advertisement manager 503. The advertisement/application association storage 504, application storage 505, and guide information storage 506 are implemented by the ROM 212 or the flash memory 214.

The input acceptor 501 accepts a user input and requests the application manager 502 and the advertisement manager 503 to perform a process.

The application manager 502 executes an application function in the application storage 505 according to a user input accepted by the input acceptor 501 (for example, an input for performing a setting required for executing a function, an input for requesting to start executing a function, etc.).

The advertisement manager 503 displays an advertisement received from the server 20. In addition, the advertisement manager 503 controls the LCD to switch from a screen displaying the advertisement to a screen displaying an application having the function posted in the advertisement, and guides the user to use the function on the screen displaying the application. For example, the control device (information processing apparatus) 110 executes a notice application which is activated when the notice icon on the control panel 215 is selected, to function as the advertisement manager 503. Before describing the advertisement manager 503 in detail, the data stored in the advertisement/application association storage 504, application storage 505, and guide information storage 506 will be described.

The advertisement/application association storage 504 stores data of information (advertising content) regarding the advertisement of an application function. The data stored in the advertisement/application association storage 504 will be described in detail, referring to FIG. 7.

FIG. 7 is an example of advertising content data according to the embodiment of the present invention. The advertising content is data received from the server 20 by the advertisement manager 503 of the control device (information processing apparatus) 110. As illustrated in FIG. 7, the advertising content includes data items such as "advertisement (function)", "uniform resource locator (URL)", and "application" for each advertisement.

The "advertisement (function)" identifies a function of the application posted in an advertisement.

The "URL" indicates a URL for identifying a location of data to be used when the control device (information processing apparatus) 110 displays an advertisement (for example, a moving image).

In this example, the "application" identifies an application that has the function posted in the advertisement (that is, which application function). The "application" is information for uniquely identifying an application, such as a package name. In addition, one advertisement (function) is associated with one application.

Referring back to FIG. 6, an application is stored in the application storage 505. The application stored in the application storage 505 refers to the "guide information" in the guide information storage 506, to guide the user to use the function of the application within the screen being displayed.

The guide information storage 506 stores guide information data. The data stored in the guide information storage 506 will be described in detail, referring to FIG. 8.

FIG. 8 is an example of guide information data according to the embodiment of the present invention. As illustrated in FIG. 8, the guide information includes data items such as "advertisement (function)" and "guide information" for each advertisement (that is, function).

The "advertisement (function)" identifies the function of the application posted in an advertisement.

The "guide information" indicates the setting items and the setting order for executing the application function. For example, the "guide information" indicates an identifier of a button (also called a key) or an input field that must be selected or input to execute the application function, and the order in which the button is selected or inputting into the input field is performed. In other words, in the "guide information", the items to be set to execute the application function and the order of setting the items are defined.

The guide information data in FIG. 8 is associated with the advertising content in FIG. 7 via the "advertisement (function)".

Referring back to the description of the advertisement manager 503 in FIG. 6, operation of displaying advertising content and operation of switching to application are described in this order.

In displaying advertising content, when the input acceptor 501 accepts an input requesting display of an advertisement, the advertisement manager 503 queries the server 20 for whether there is advertising content. If there is advertising content, the advertisement manager 503 receives the advertising content data such as the data as illustrated in FIG. 7 from the server 20, and displays the advertisement on the control panel 215.

In switching to application, when the input acceptor 501 accepts, on the screen displaying the advertisement, an input requesting execution of the application function, the advertisement manager 503 refers to the advertisement/application association storage 504 and searches for an application having the function posted in the advertisement. In addition, the advertisement manager 503 activates an application associated with the advertisement. For example, if the OS of the control device (information processing apparatus) 110 is Android, the advertisement manager 503 puts the information of the application function into an intent and executes startActivity, to notify an application 603 of a function to be executed by the application 603.

Figure 9:
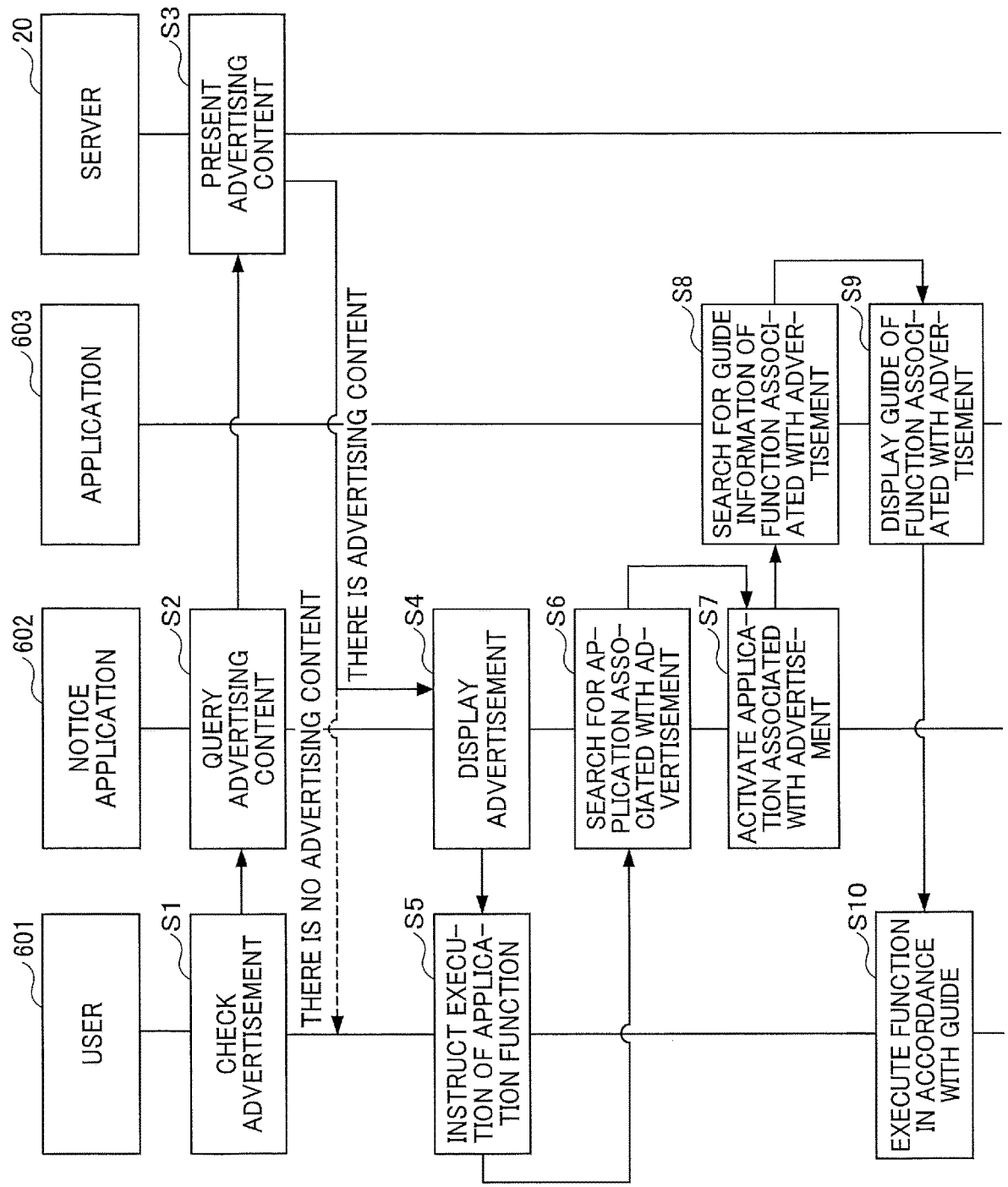
FIG. 9 is a sequence diagram of operation of switching from an advertisement to an application and executing a function according to the embodiment of the present invention.

FIG. 9 is a sequence diagram of operation of switching a display from a screen displaying an advertisement to a screen displaying a function of an application and executing the function, according to the embodiment of the present invention.

At S1, a user 601 selects an icon (for example, a notice icon displayed on a screen 1001 in FIG. 10) for displaying the advertisement of an application function on the control panel 215 of the control device (information processing apparatus) 110.

At S2, a notice application 602 (that is, the advertisement manager 503) queries the server 20 for whether there is advertising content in accordance with the selection of the notice icon in S1.

At S3, if there is advertisement content queried at S2, the server 20 transmits the advertising content data to the notice application 602.

For example, the server 20 can distribute the advertisement of a function added by an application update of the image forming apparatus 10 during a predetermined period (for example, the last XX months).

If there is no advertising content queried at S2, no advertisement is displayed and the operation ends.

At S4, the notice application 602 displays the advertisement presented by the server 20 at S3 on the control panel 215. For example, the notice application 602 displays a screen for the user to select an advertisement of interest from a plurality of advertisements (for example, a screen on which summary information of each advertisement is displayed, such as the screen 1002 in FIG. 10), and when the user selects an advertisement of interest, the notice application 602 can display detailed information of the advertisement (for example, a screen such as a screen 1003 in FIG. 10).

The notice application 602 may acquire the summary information and the detailed information of the advertisement from the server 20 together, or may acquire the summary information and then the detailed information of the advertisement selected from the user.

Figure 10:
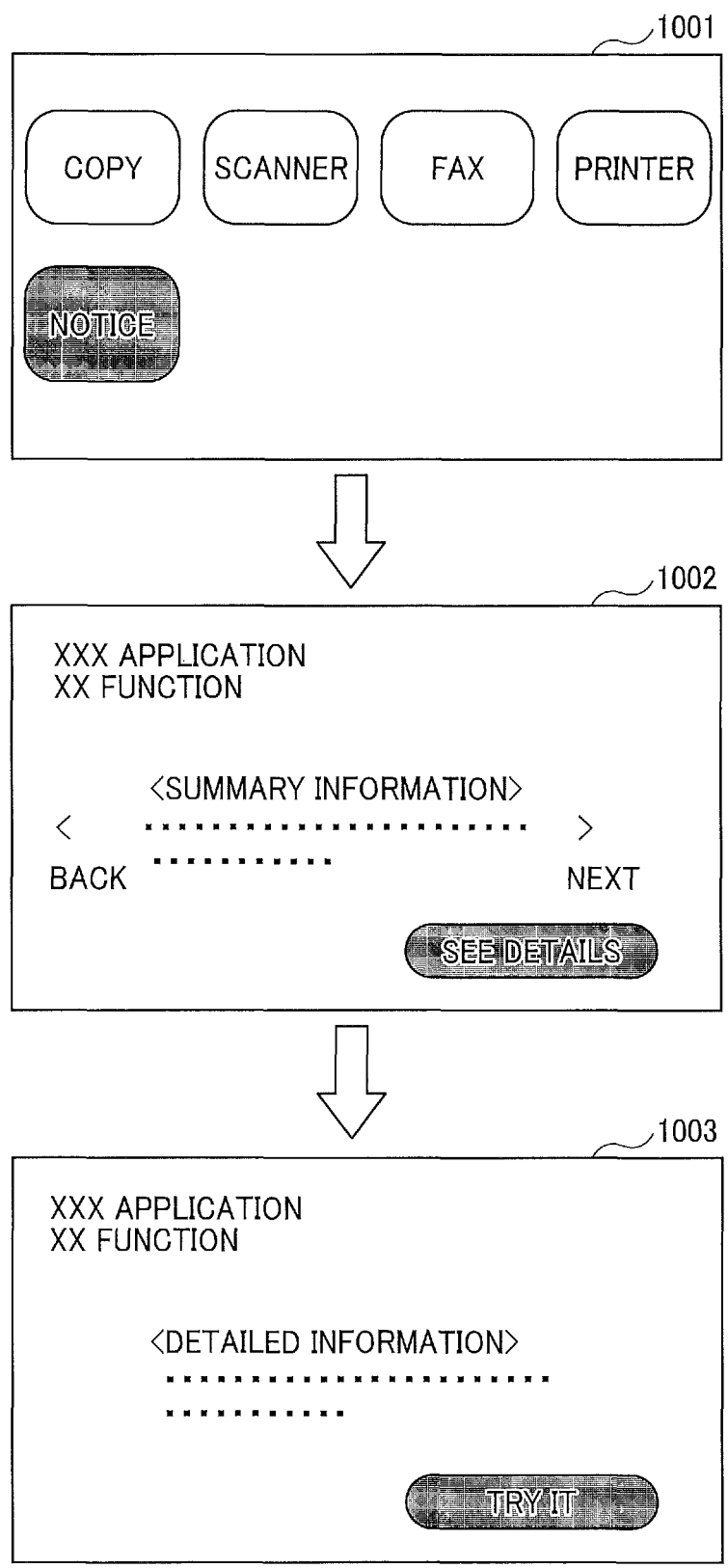
FIG. 10 is an illustration of transition diagrams of a screen displayed on the control device (information processing apparatus) according to the embodiment of the present invention.

At S5, the user performs an input requesting execution of an application function on a screen displaying the advertisement (for example, the user selects the "Try it" button displayed on the screen 1003 in FIG. 10).

At S6, the notice application 602 refers to the advertisement/application association storage 504, and searches for the application 603 associated with the advertisement that the user has requested to execute the function at S5.

At S7, the notice application 602 activates the application 603 searched at S6. For example, if the OS of the control device (information processing apparatus) 110 is Android, the notice application 602 puts the information of the application function into an intent and executes startActivity, to notify the application 603 of a function to be executed by the application 603.

At S8, the application 603 (that is, the application in the application storage 505) refers to the guide information storage 506 to search for the guide information of the function notified in S7.

At S9, the application 603 guides the user to use the function in accordance with the guide information of the function searched in S8.

At S10, the user 601 can execute the application function in accordance with the guidance of S9.

The following describes how to execute the function with three examples.

Example 1

The application 603 displays the setting items specified in the guide information (that is, a button or an input field that must be selected or input to execute the application function) in the setting order specified in the guide information (that is, the order in which the button is selected or inputting into the input field is performed) in such a manner that the user can easily set the setting items. For example, the application 603 can focus on the button or input field (that is, the application 603 brings the button or input field to a state of accepting a user selection or input) and highlight the button or input field with an arrow and a speech bubble.

For example, if the function is "cover setting", a "finish setting" key is focused on the top screen of the application 603 (application for copy). When the user selects the "finish setting" key, a "cover/insertion sheet setting" key is focused or the like. When the user selects the "cover/insertion sheet setting" key, the "cover setting" key is focused or the like. When the user selects the "cover setting" key, the function of the cover setting is executed. In this way, the user can set the setting items by the user per se in accordance with the guide displayed by the application (that is, the guide to clearly specify the setting items in a predetermined setting order) and then can start execution of the function.

Example 2

The application 603 selects, or inputs a predetermined value into, the setting items specified in the guide information (that is, a button or an input field that must be selected or input to execute the application function) in the setting order specified in the guide information (that is, the order in which the button is selected or inputting into the input field is performed). In other words, in Example 2, instead of the user selecting or inputting into the setting items as in Example 1, the application 603 performs a process of selecting or inputting into the setting items (even if there is no instruction from the user).

For example, if the function is "cover setting", the "cover setting" key is focused on the application 603 in a state after the "finish setting" key and the "cover/insertion sheet setting" key are already selected. When the user selects the "cover setting" key, the function of the cover setting is executed. In this way, the user can execute the function simply by selecting the button to start the execution of the function without the trouble of setting the setting items by the user per se.

Example 3

The application 603 selects, or inputs a predetermined value into, the setting items specified in the guide information (that is, a button or an input field that must be selected or input to execute the application function) in the setting order specified in the guide information (that is, the order in which the button is selected or inputting into the input field is performed). Moreover, the application 603 starts execution of the function. In other words, in Example 3, instead of the user selecting a button to start execution of the function as in Example 2, the application 603 performs a process of starting the execution of the function (even if there is no instruction from the user).

For example, if the function is "cover setting", when the user performs an input requesting execution of an application function on a screen displaying an advertisement (for example, the user selects the "Try it" button displayed on screen 1003 in FIG. 10), copy for which the cover setting is done is executed. In this way, the user can execute the function without the trouble of setting the setting items by the user per se or selecting the button to start the execution of the function.

FIG. 10 is an illustration of transition diagrams of a screen displayed on the control device (information processing apparatus) 110 according to the embodiment of the present invention. First, a home screen on which a list of applications such as the screen 1001 is displayed on the control panel 215 of the control device (information processing apparatus) 110. When the user selects an icon (for example, a notice icon displayed on the screen 1001) for displaying an advertisement of an application function, a screen such as the screen 1002 for the user to select an advertisement of interest from a plurality of advertisements is displayed. The summary information in the screen 1002 can include the title of the notice and the summary of the notice. When the user selects an advertisement of interest in the screen 1002, a screen indicating detailed information of the advertisement such as the screen 1003 is displayed. The detailed information in the screen 1003 can include the introduction of an application function and the explanation of an operation procedure. As illustrated in FIG. 10, the screen 1003 includes a button for requesting execution of the application function (for example, the "Try it" button displayed on the screen 1003).

The advertisement manager 503 can record the history of a user input requesting execution of an application function on a screen displaying an advertisement. In addition, the advertisement manager 503 can display an advertisement by which the user has executed a function, on the control panel 215 of the control device (information processing apparatus) 110 on the basis of the recorded history. Therefore, the user can immediately use an application function posted in the advertisement by which the function has been executed in the past (that is, the advertisement that the user was interested in the past).

In addition, the advertisement manager 503 can interrupt the operation for setting the function while the application 603 is guiding the user to use the function in accordance with the guide information of the function. Specifically, when a predetermined button or a predetermined key is selected on the control panel 215, the advertisement manager 503 can cause the application 603 to interrupt the operation for setting the function and execute another process (for example, when an other person wants to copy quickly). Moreover, the advertisement manager 503 allows the user to select whether to restart or cancel the display of the guide when the screen returns to the interrupted screen after the other process is completed, and when the restart is selected, the advertisement manager 503 can restart the display of the guide from the point at which the display was interrupted.

As described above, in the embodiment of the present invention, a screen displaying an advertisement can be switched to an application having a function posted in the advertisement, and the user can be guided to use the function in the screen of the application to which the switching is performed. Therefore, if there is a function that the user wants to use while watching an advertisement, the user can use that function immediately.

In the present specification, the configuration in which the image forming apparatus 10 includes the control device (information processing apparatus) 110 is illustrated as an example, but the present invention is not limited to the above configuration. Information processing apparatuses such as tablet terminals, smart phones, mobile phones, and personal digital assistants (PDAs) can function as the control device of the image forming apparatus 10.

The set of apparatuses described in the examples is merely illustrative of one of a plurality of computing environments for implementing the embodiment disclosed herein. In some embodiments, the server 20 includes a plurality of computing devices such as server clusters. The plurality of computing devices are configured to communicate with one another via a communication link of any type including a network and a shared memory, and perform the process disclosed in this specification.

The present invention is not limited to the configuration mentioned here, such as a combination of the configuration described in the above embodiment with other elements. In these respects, the configuration can be changed without departing from the spirit of the present invention, and can be appropriately determined in accordance with the application form.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
a memory that stores a plurality of applications; and
circuitry configured to display on a display, a screen including notification information on a function of a particular application of the plurality of applications, and to activate the particular application in response to an input of a request to execute the function on the screen,
wherein the screen further includes an advertisement of the function received from a server, the advertisement of the function including an introduction of the function and an explanation of an operation procedure of the function, and
wherein the particular application configures the circuitry to execute the function in accordance with guide information defining one or more setting items to be set to execute the function and an order of setting the setting items.

2. The information processing apparatus of claim 1, wherein the particular application configures the circuitry to display, on the display, the setting items defined by the guide information in a setting order defined by the guide information.

3. The information processing apparatus of claim 1, wherein the particular application configures the circuitry to display a screen for inputting a request to start execution of the function in a state where the setting items defined by the guide information are set.

4. The information processing apparatus of claim 1, wherein in response to an input of a request to execute the function on the screen including notification information on the function of the particular application, the particular application configures the circuitry to perform a process for setting the setting items defined by the guide information and a process for starting execution of the function.

5. The information processing apparatus of claim 1, wherein the notification information includes notification information on a function added by an update of the particular application in a predetermined period.

6. The information processing apparatus of claim 1, wherein the particular application configures the circuitry to display, notification information for which execution of the function has been requested, based on a history of an input of a request to execute the function on the screen including notification information on the function of the particular application.

7. The information processing apparatus of claim 1, wherein the particular application configures the circuitry to interrupt an operation for setting the function of the particular application while the function is set by the particular application in accordance with the guide information.

8. The information processing apparatus of claim 7, wherein the particular application configures the circuitry to display a screen for selecting whether to restart or cancel the operation interrupted for setting the function, and to restart the operation for setting the function from a time when the operation is interrupted when the restart is selected.

9. A method executed by an information processing apparatus installed with a plurality of applications, the method comprising:
displaying on a display a screen including notification information on a function of a particular application of the plurality of applications;
activating the particular application in response to an input of a request to execute the function on the screen, wherein the screen further includes an advertisement of the function received from a server, the advertisement of the function including an introduction of the function and an explanation of an operation procedure of the function; and
executing, by the particular application, the function in accordance with guide information defining one or more settings items to be set to execute the function and an order of setting the setting items.

10. A non-transitory recording medium which, when executed by one or more processors, cause the processors to perform a method comprising:
displaying on a display a screen including notification information on a function of a particular application of a plurality of applications installed on an information processing apparatus;

activating the particular application in response to an input of a request to execute the function on the screen, wherein the screen further includes an advertisement of the function received from a server, the advertisement of the function including an introduction of the function and an explanation of an operation procedure of the function; and executing, by the particular application, the function in accordance with guide information defining one or more settings items to be set to execute the function and an order of setting the setting items.

\* \* \* \* \*